(12) United States Patent
Steele, Jr.

(10) Patent No.: US 7,069,289 B2
(45) Date of Patent: *Jun. 27, 2006

(54) FLOATING POINT UNIT FOR DETECTING AND REPRESENTING INEXACT COMPUTATIONS WITHOUT FLAGS OR TRAPS

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 508 days.

This patent is subject to a terminal disclaimer.

(21) Appl. No.: 10/035,589

(22) Filed: Dec. 28, 2001

(65) Prior Publication Data

US 2002/0198918 A1 Dec. 26, 2002

Related U.S. Application Data

(60) Provisional application No. 60/293,173, filed on May 25, 2001.

(51) Int. Cl.
*G06F 7/38* (2006.01)

(52) U.S. Cl. .................. 708/495; 708/525; 708/497
(58) Field of Classification Search ............. 708/525, 708/551, 495, 497
See application file for complete search history.

(56) References Cited

U.S. PATENT DOCUMENTS 3,725,649 A 4/1973 Deerfield (Continued)

OTHER PUBLICATIONS

U.S. Appl. No. 10/320,547, filed Dec. 17, 2002, Steele, Jr.
U.S. Appl. No. 10/320,450, filed Dec. 17, 2002, Steele, Jr.
U.S. Appl. No. 10/035,581, filed Dec. 28, 2001, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,746, filed Dec. 28, 2001, Steele, Jr.
U.S. Appl. No. 10/035,747, filed Dec. 28, 2001, Steele, Jr.

(Continued)

*Primary Examiner*—Chuong Dinh Ngo
(74) *Attorney, Agent, or Firm*—Finnegan, Henderson, Farabow, Garrett & Dunner L.L.P.

(57) ABSTRACT

A method and system perform a rounding step of a floating point computation on at least one floating point operand to preserve an inexact status. Inexact status information generated from the rounding step may be encoded within the result, instead of requiring a separate floating point status register for the inexact status information. In one embodiment, inexact status information is preserved by determining whether the at least one operand is inexact. Further, an intermediate result of the floating point computation is analyzed to determine whether it is inexact. Finally, the intermediate result is rounded based on whether the at least one operand is inexact and whether the intermediate result is inexact to preserve an inexact status of the at least one operand and the intermediate result.

29 Claims, 5 Drawing Sheets

OTHER PUBLICATIONS

U.S. Appl. No. 10/036,133, filed Dec. 28, 2001, Steele, Jr.
Title: Lecture Notes on the Status of "IEEE Standard 754 for Binary Floating–Point Arithmetic", by Prof. W. Kahan, May 31, 1996, pp. 1–30.
Title: "Interval Arithmetic Specification" by Dmitri Chiriaev & G. William Walster, Draft revised May 4, 1998, pp. 1–78.
Title: "IEEE Standard for Binary Floating–Point Arithmetic IEEE Standard 754–1985," by Standards Committee of the IEEE Computer Society, The Institute of Electrical and Electronics Engineers, Inc., copyright 1985, pp. 1–14.
Office Action mailed May 5, 2005 in U.S. Application No. 10/035,589.

U.S. PATENT DOCUMENTS

| Patent Number | | Date | Inventor |
|---|---|---|---|
| 4,777,613 A | | 10/1988 | Shahan et al. |
| 4,788,655 A | | 11/1988 | Nakayama et al. |
| 4,991,131 A | | 2/1991 | Yeh et al. |
| 5,065,352 A | | 11/1991 | Nakano |
| 5,126,963 A | | 6/1992 | Fukasawa |
| 5,161,117 A | | 11/1992 | Waggener, Jr. |
| 5,249,149 A | | 9/1993 | Cocanougher et al. |
| 5,307,303 A | | 4/1994 | Briggs et al. |
| 5,347,481 A | | 9/1994 | Williams |
| 5,347,482 A | | 9/1994 | Williams |
| 5,357,237 A | | 10/1994 | Bearden et al. |
| 5,363,321 A | | 11/1994 | Dao Trong et al. |
| 5,365,465 A | | 11/1994 | Larson |
| 5,481,489 A | | 1/1996 | Yanagida et al. |
| 5,570,310 A | | 10/1996 | Smith |
| 5,666,301 A | | 9/1997 | Makino |
| 5,748,516 A | | 5/1998 | Goddard et al. |
| 5,812,439 A | * | 9/1998 | Hansen ...................... 708/497 |
| 5,862,066 A | | 1/1999 | Rossin et al. |
| 5,892,697 A | * | 4/1999 | Brakefield .................. 708/496 |
| 5,931,943 A | | 8/1999 | Orup |
| 5,953,241 A | | 9/1999 | Hansen et al. |
| 5,963,461 A | * | 10/1999 | Gorshtein et al. .......... 708/503 |
| 5,978,901 A | | 11/1999 | Luedtke et al. |
| 5,995,991 A | | 11/1999 | Huang et al. |
| 6,009,511 A | | 12/1999 | Lynch et al. ................ 712/222 |
| 6,049,865 A | | 4/2000 | Smith |
| 6,081,823 A | | 6/2000 | Purcell et al. |
| 6,105,047 A | | 8/2000 | Sharangpani et al. |
| 6,108,772 A | | 8/2000 | Sharangpani |
| 6,131,106 A | | 10/2000 | Steele, Jr. |
| 6,138,135 A | | 10/2000 | Karp |
| 6,151,669 A | | 11/2000 | Huck et al. |
| 6,189,094 B1 | | 2/2001 | Hinds et al. |
| 6,205,460 B1 | | 3/2001 | Steele, Jr. |
| 6,219,685 B1 | | 4/2001 | Story |
| 6,256,655 B1 | | 7/2001 | Ezer et al. |
| 6,286,023 B1 | | 9/2001 | Purcell et al. |
| 6,286,024 B1 | | 9/2001 | Yano et al. |
| 6,360,189 B1 | | 3/2002 | Hinds et al. |
| 6,393,555 B1 | | 5/2002 | Meier et al. |
| 6,490,607 B1 | | 12/2002 | Oberman |
| 6,571,265 B1 | | 5/2003 | Story |
| 6,594,681 B1 | * | 7/2003 | Prabhu ....................... 708/504 |
| 6,629,120 B1 | | 9/2003 | Walster et al. |
| 6,658,443 B1 | | 12/2003 | Walster |
| 6,658,444 B1 | | 12/2003 | Walster et al. |
| 6,697,832 B1 | | 2/2004 | Kelley et al. |
| 6,732,134 B1 | | 5/2004 | Rosenberg et al. |
| 6,789,098 B1 | | 9/2004 | Dijkstra |
| 2002/0194232 A1 | | 12/2002 | Walster |
| 2003/0033335 A1 | | 2/2003 | Walster |

* cited by examiner

FLOATING POINT UNIT FOR DETECTING AND REPRESENTING INEXACT COMPUTATIONS WITHOUT FLAGS OR TRAPS

RELATED APPLICATIONS

Applicant claims the right of priority based on U.S. Provisional Patent Application No. 60/293,173 filed May 25, 2001 in the name of Guy. L. Steele, Jr.

U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

DESCRIPTION OF THE INVENTION

1. Field of the Invention

The invention generally relates to systems and methods for indicating the status of a floating point value, and more specifically to systems and methods for indicating whether a result of a floating point operation is exact or inexact and preserving the status after a floating point calculation.

2. Background of the Invention

IEEE Standard 754 (hereinafter "IEEE Std. 754" or "the Standard") published in 1985 by the Institute of Electrical and Electronic Engineers, and adopted by the American National Standards Institute (ANSI), defines several standard formats for expressing values as a floating point number. In accordance with IEEE Std. 754, a floating point format is represented by a plurality of binary digits, or "bits," having the structure:

$$se_{msb} \ldots e_{lsb}f_{msb} \ldots f_{lsb}$$

where "msb" represents "most significant bit" and "lsb" represents "least significant bit." The bit string comprises a sign bit, s, which indicates whether the number is positive or negative. The bit string further comprises an exponent field having bits $e_{msb} \ldots e_{lsb}$ representing a biased exponent, e. Still further, the bit string comprises a fraction field having bits $f_{msb} \ldots f_{lsb}$ representing a fraction field of a significand. A significand comprises an explicit or implicit leading bit to the left of an implied binary point and a fraction field to the right of the implied binary point.

IEEE Std. 754 defines two general formats for expressing a value, namely, a "single" format, which comprises thirty-two bits, and a "double" format, which comprises sixty-four bits. In the single format, there is one sign bit, s, eight bits, $e_7 \ldots e_0$, comprising the exponent field, and twenty-three bits, $f_{22} \ldots f_0$, comprising the fraction field. In the double format, there is one sign bit, s, eleven bits, $e_{10} \ldots e_0$, comprising the exponent field, and fifty-two bits, $f_{51} \ldots f_0$, comprising the fraction field.

The value of a number represented in accordance with IEEE Std. 754 is determined based on the bit patterns of the exponent field bits, $e_{msb} \ldots e_{lsb}$, and the fraction field bits, $f_{msb} \ldots f_{lsb}$, both for the single and double formats. The value of a number represented in accordance with IEEE Std. 754 is positive or negative infinity, depending on the value of the sign bit, s, if the exponent field bits, $e_{msb} \ldots e_{lsb}$, are all binary ones (that is, if the bits represent a binary-encoded value of "255" in the single format or "2047" in the double format) and the fraction field bits, $f_{msb} \ldots f_{lsb}$, are all binary zeros. In particular, the value, v, of the number is $v=(-1)^s\infty$, where "$\infty$" represents the value infinity. On the other hand, if the exponent field bits, $e_{msb} \ldots e_{lsb}$, are all binary ones and the fraction field bits, $f_{msb} \ldots f_{lsb}$, are not all zeros, then the value that is represented is deemed "not a number," abbreviated "NaN."

Further, if the exponent bits, $e_{msb} \ldots e_{lsb}$, are neither all binary ones nor all binary zeros (that is, if the bits represent a binary-encoded value between 1 and 254 in the single format or between 1 and 2046 in the double format), the number is in a "normalized" format and the value of the number is $v=(-1)^s2^{e-bias}(1.|f_{msb} \ldots f_{lsb})$, where "|" represents a concatenation operation. That is, in the normalized format, a leading bit having the value "one" followed by a binary point and the fraction field bits is implied thereby increasing the size of the fraction field by one bit to twenty four bits in the single format and to fifty three bits in the double format. In effect, the fraction field represents a value greater than or equal to one and less than two.

Still further, if the exponent field bits, $e_{msb} \ldots e_{lsb}$, are all binary zeros and the fraction field bits, $f_{msb} \ldots f_{lsb}$, are not all zero, the number is in a "de-normalized" format and the value of the number is $v=(-1)^s2^{e-bias+1}(0.|f_{msb} \ldots f_{lsb})$. The range of values that can be expressed in the de-normalized format is disjoint from the range of values that can be expressed in the normalized format, for both the single and double formats.

Finally, if the exponent field bits, $e_{msb} \ldots e_{lsb}$, are all binary zeros and the fraction field bits, $f_{msb} \ldots f_{lsb}$, are all zeros, the value of the number is "zero". The value "zero" may be positive zero or negative zero, depending on the value of the sign bit.

Generally, to perform computations whose results conform to IEEE Std. 754, floating point units are designed to generate a result in response to a floating point instruction in three steps: an approximation calculation step, a rounding step, and a packaging step. In the approximation calculation step, an approximation to the absolutely accurate mathematical result is calculated (assuming that the input operands represent the specific mathematical values as described by IEEE Std. 754). The approximation is sufficiently precise as to allow the accurate mathematical result to be represented by a sign bit, exponent bits, N bits of the presumed result fraction, a guard bit, and a sticky bit. The number of exponent bits representing the accurate mathematical result is typically greater than the number of exponent bits in the standard floating-point format. The value of the exponent is such that the value of the fraction consists of a 1 before the binary point and a fraction after the binary point.

The N bits of the presumed result fraction, the guard bit, and the sticky bit are calculated so as to obtain the same result as the following conceptual procedure. First, calculate the mathematical result to an infinite number of bits in binary scientific notation so that there is no bit position in the significand where bits of lesser significance are all binary ones. This restriction avoids the ambiguity between, for example, 1.100000 . . . and 1.011111 . . . as representations of the value "one-and-one-half". Next, set the intermediate result significand equal to the N most significant bits of the infinite significand. Then, set the guard bit equal to the N+1 most significant bit of the infinite significand. Finally, set the sticky bit equal to zero if and only if all remaining bits of the infinite significand are zero. In other words, the sticky bit is the logical OR of all remaining bits of the infinite fraction after the guard bit. This conceptual procedure may be impossible to carry out in practice, under some circumstances.

In the rounding step, the guard bit and the sticky bit are used to determine whether to alter the result of the approximation calculation step. The sign bit and/or some of the bits of the presumed significand generated in the approximation calculation step may also be used to determine whether to alter the result of the approximation calculation step. For the rounding modes defined by IEEE Std. 754, the result of the approximation calculation step may be altered by increasing the magnitude of the number represented by the presumed exponent and fraction generated in the approximation calculation step. Increasing the magnitude of the number is done by adding one to the significand in its least significant bit position, as if the significand was a binary integer. If all the bits of the significand are equal to one, then the magnitude of the number is "increased" by changing it to a high-order 1-bit format followed by all 0-bits and adding 1 to the exponent.

IEEE Std. 754 defines four rounding modes: a round-toward-nearest mode, a round-toward-minus-infinity mode, a round-toward-plus-infinity mode, and a round-toward-zero mode. For the round-toward nearest mode, the magnitude of the number represented by the presumed exponent and fraction generated in the approximation calculation step is increased if the guard bit and either the sticky bit or the least significant bit of the significand are equal to a binary one. For the round-toward-minus-infinity mode, the magnitude is increased if the sign bit and either the guard bit or the sticky bit are equal to a binary one. For the round-toward-plus-infinity mode, the magnitude is increased if the sign bit is equal to binary zero and either the guard bit or the sticky bit is equal to a binary one. For the round-toward-zero mode the magnitude is not increased.

The result of the approximation calculation step is rounded up (i.e., towards positive infinity) if the result of the approximation calculation step is a positive number and the magnitude of the number is increased. Furthermore, the result of the approximation calculation step is effectively rounded up if the result of the approximation calculation step is a negative number and the magnitude of the number is not increased. On the other hand, the result of the approximation calculation step is rounded down (i.e., towards negative infinity) if the result of the approximation calculation step is a negative number and the magnitude of the number is increased. Further, the result of the approximation calculation step is effectively rounded down if the result of the approximation calculation step is a positive number and the magnitude of the number is not increased.

In the packaging step, the result is packaged into a standard floating-point format. This may involve substituting a special representation, such as the special representation for infinity and Nan, if an exceptional condition occurs, for example e.g., an overflow, underflow, or invalid operation. Packaging may also involve removing a leading 1-bit of the fraction of the result because the leading 1-bit is implicit in the standard format. Further, packaging may involve shifting the fraction to construct a denormalized number. If any input operand is NaN, the packaging step may force the result to be NaN. The packaging step may force the result to be infinity. If the result is to be a NaN or infinity, any result from the rounding step will be discarded and the appropriate representation will be provided as the result.

In addition, in the packaging step, floating-point status information is generated for a particular floating point operation. The status information is normally stored in a floating point status register. Status information may include: (1) information indicating whether a particular operand is invalid for the operation to be performed ("invalid operation"); (2) information indicating whether a divisor is zero when the operation to be performed is division, ("division-by-zero"); (3) information indicating whether an overflow occurred during the operation ("overflow"); (4) information indicating whether an underflow occurred during the operation ("underflow"); and (5) information indicating whether the rounded result of the operation is not exact ("inexact"). The inexact indicator may be used to indicate whether the result generated in the rounding step has the same value as the result generated in the approximation calculation step. This information is typically represented by flags that are stored in the floating point status register.

Regarding the inexact indicator, IEEE Std. 754 does not provide a mechanism for indicating whether a result is inexact based on the inexact status of the operand. Still further, because status information is represented by flags that are stored in floating point status registers, implicit serialization is required. Therefore, it would be desirable to indicate the inexact status of a result within the result itself, rather than representing the inexact status by flags stored in floating point status registers. Accordingly, a rounding mode is needed to produce a rounded result having inexact status information stored in the result, wherein the result is indicated as being inexact if an operand is inexact.

SUMMARY OF THE INVENTION

There is provided a method for performing a rounding step of a floating point computation on at least one floating point operand to preserve an inexact status. The method comprises receiving the at least one operand and determining whether the at least one operand is inexact. The method further comprises determining whether an intermediate result of the floating point computation is inexact. Still further, the method comprises rounding the intermediate result based on whether the at least one operand is inexact and whether the intermediate result is inexact to preserve an inexact status of the at least one operand and the intermediate result.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to exemplary embodiments of the invention, examples of which are illustrated in the accompanying drawings. Wherever possible, the same reference numbers will be used throughout the drawings to refer to the same or like parts.

The instant application is directed to an arrangement whereby whether a floating point value is inexact may be indicated in the value itself, thereby obviating the necessity of providing a separate floating point status register. Further, if a floating point value is used as an operand in a floating point operation, whether the value is inexact may be used in determining whether the result is inexact. Still further, invention further provides a rounding mode and associated rounding unit for providing the exact or inexact indication in the result.

Figure 1:
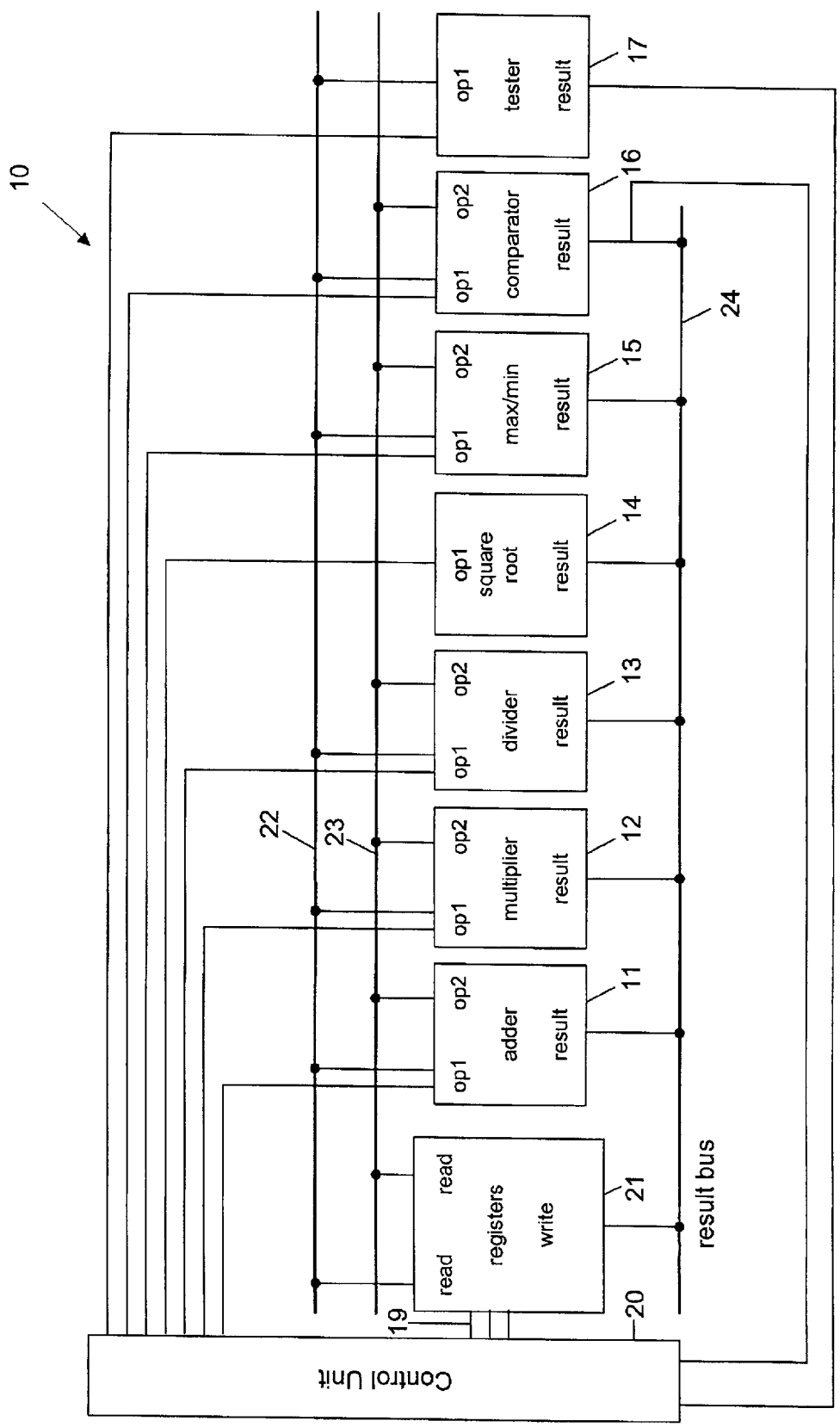
FIG. 1 is a functional block diagram of an exemplary floating point unit constructed in accordance with an embodiment of the invention.

FIG. 1 is a functional block diagram of an exemplary floating point unit 10, which includes a plurality of functional units, such as an adder unit 11, a multiplier unit 12, a divider unit 13, a square root unit 14, a maximum/minimum unit 15, a comparator unit 16, and a tester unit 17. The functional units 11–17 operate under the control of functional unit control signals 19 provided by a control unit 20.

The control unit 20 operates in response to floating point instructions provided by an arrangement not depicted in FIG. 1, but is known to those of ordinary skill in the art. In response to the floating point instructions and various status signals (not shown, but are known to those of ordinary skill in the art), the control unit 20 generates register control signals 19 that enable operands to be coupled from the registers 21 onto the operand buses 22, 23. The control unit 20 also generates functional unit control signals 19 that enable the functional units 11–17 to receive the operands from the operand buses 22, 23 and generate results. In addition, the control unit 20 generates register control signals 19 that enable the results generated by the functional units 11–16 to be coupled onto a result bus 24, which transfers the results to the registers 21 for storage. The results generated by the functional units 16 and functional unit 17 are coupled to the control unit 20 for use by the control unit 20 in a conventional manner.

The adder 11 receives two operands, x and y, and generates the sum of the operands, i.e., $S(x, y)=x+y$, as the result. The multiplier 12 receives two operands, x and y, and generates the product of the operands, $P(x, y)=x*y$, as the result. The divider 13 may generate as the result the quotient, $Q(x, y)=x/y$, of one operand, x, divided by the other, y. Alternatively, the divider may generate as a result the remainder, $REM(x, y)=y-(y*n)$, where "n" is an integer nearest the value x/y.

The square root unit 14 receives one operand, x, and generates the square root of the operand, $SR(x)=sqrt(x)$, as the result. The maximum/minimum unit 15 receives two operands, x and y, and couples one of the maximum $MAX(x, y)$ or minimum $MIN(x, y)$ of the two operands. The comparator unit 16 receives two operands, x and y, and identifies which, if either, operand is greater than the other (or equivalently, which operand is less than the other). The tester unit 17 receives one operand and provides a result comprising at least one bit describing numerical properties of the operand, as will be described below.

It is noted that the exemplary floating point unit 10 does not include a floating point status register for storing floating point status information, which is included in prior art floating point units. Instead, the functional units 11–17 encode the floating point status information in results that are generated in certain formats. This will be illustrated in connection with FIG. 2, which depicts exemplary floating point formats of operands that the functional units 11–17 may receive and results they may generate.

Figure 2:
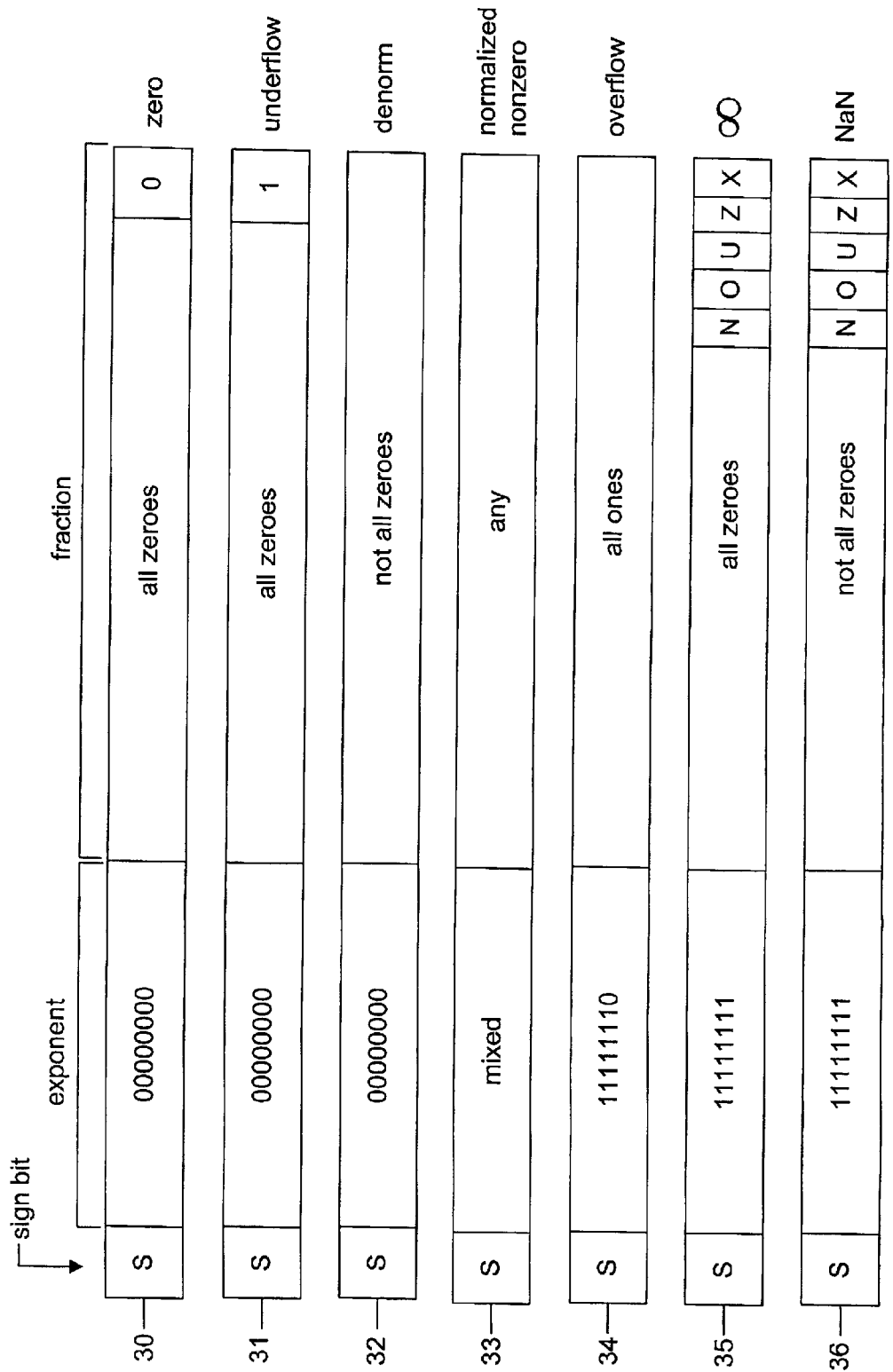
FIG. 2 depicts exemplary formats for representations of floating point values generated by the floating point unit depicted in FIG. 1.

With reference to FIG. 2, seven exemplary formats are depicted, including a zero format 30, an underflow format 31, a denormalized format 32, a normalized non-zero format 33, an overflow format 34, an infinity format 35, and a not-a-number (NaN) format 36.

The zero format 30 represents the values "zero," or, more specifically, positive or negative zero, depending on the value of the sign bit, s.

The underflow format 31 indicates that the result of a computation is an underflow. In the underflow format, the sign bit, s, indicates whether the result is positive or negative; the exponent field bits, $e_{msb} \ldots e_{lsb}$, are all binary zeros; and the fraction field bits, $f_{msb} \ldots f_{lsb+1}$, are all binary zeros. The least significant bit of the fraction field, $f_{lsb}$, is a binary one.

Except as described below, the denormalized format 32, except in the case of the values represented by the underflow format 31, may have the same format as the IEEE Std. 754 denormalized format and is used to represent substantially the same range of values. Similarly, the normalized non-zero format 33 may have the same format as the IEEE Std. 754 normalized non-zero format and is used to represent substantially the same range of values.

The overflow format 34 indicates that the result of a computation is an overflow. In the overflow format 34, the sign bit, s, indicates whether the result is positive or negative; the exponent field bits, $e_{msb} \ldots e_{lsb+1}$, are all binary ones, with the least significant bit, $e_{lsb}$, being a binary zero; and the fraction field bits, $f_{msb} \ldots f_{lsb}$, are all binary ones.

The infinity format 35 indicates that the result is infinite. In the infinity format 35, the sign bit, s, indicates whether the result is positive or negative; the exponent field bits, $e_{msb} \ldots e_{lsb}$, are all binary ones; and the fraction field bits, $f_{msb} \ldots f_{lsb+5}$, are all binary zeros. The five least significant fraction field bits, $f_{lsb+4} \ldots f_{lsb}$, are flags, which will be described below.

The NaN format 36 indicates that the result is not a number. In the NaN format 36, the sign bit, s, may be any value; the exponent field bits, $e_{msb} \ldots e_{lsb}$, are all binary ones; and the fraction field bits, $f_{msb} \ldots f_{lsb+5}$, are not all binary zeros. The five least significant fraction field bits, $f_{lsb+4} \ldots f_{lsb}$, are flags, which will be described below.

For the infinity format 35 and the NaN format 36, the five flags of the five least significant fraction field bits, $f_{lsb+4} \ldots f_{lsb}$, include the IEEE Std. 754 flags. These flags include an invalid operation flag, n, an overflow flag, o, an underflow flag, u, a division-by-zero flag, z, and an inexact flag, x. For example, a number in the NaN format 36 with the overflow flag, o, and the division-by-zero flag, z, set, indicates that the number resulted from computation in which an overflow occurred and a divide by zero was attempted.

The flags provide the same status information in the exemplary floating point unit 10 as would be provided by a conventional floating point status register (not shown). The status information is part of the result and is stored with the result in the registers 21. By storing status information in this way, the control unit 20 may enable multiple instructions to be contemporaneously executed because floating point status information that may be generated during execution of one instruction, when stored, will not over-write previously-stored floating point status information generated during execution of another instruction.

The inexact flag, x, of the infinity format 35 and the NaN format 36 indicates whether the result generated in the rounding step has the same value as the result generated in the approximation calculation step.

Embodiments of the invention described herein provide an arrangement whereby an inexact indication can also be provided in connection with results in other formats. Generally, in accordance with an embodiment of the invention, denormalized format 32 and the normalized non-zero format 33, indicate whether a value is exact or inexact by the least significant bit $f_{lsb}$ of the value. For the zero format 30 and the infinity format 35, values are always considered to be exact. For the underflow format 31 and the overflow format 34, the values are always considered to be inexact.

Furthermore, in addition to the IEEE Std. 754 rounding modes, an embodiment of the invention provides an inexact rounding mode that, if the result of a floating point computation is inexact, operates to preserve the fact that the result is inexact and advantageously provide an indication thereof in the result. For the rounding step of the inexact rounding mode, the floating point unit 10, sets the least significant bits $f_{lsb+1}$ and $f_{lsb}$ of the rounded result based on whether one or more of the operands are inexact. In one embodiment, the least significant bits $f_{lsb+1}$ and $f_{lsb}$ of the rounded result may be set based on the guard bit, the sticky bits, and the two least significant bits, $f_{lsb+1}$ and $f_{lsb}$, of the fraction portion of the approximation generated during the approximation calculation step.

In an embodiment of the present invention, for the denormalized format 32 and the normalized non-zero format 33, a rounded result is indicated as being exact if two conditions are satisfied. The first condition is that no operand used in the computation of the rounded result is inexact. The second condition is that, for the result generated during the approximation calculation step, neither the least significant bit, $f_{lsb}$, of the fraction field, the guard bit, nor the sticky bit equals a binary one. If at least one of these conditions is not satisfied, the rounded result will be indicated as being inexact.

In one embodiment, to indicate a rounded result as being inexact, the least significant bit, $f_{lsb}$, of the fraction field is set to a binary one and exact if the least significant bit, $f_{lsb}$, of the fraction field equals a binary zero.

For a calculation whose operand or operands are exact, if the fraction field bits, $f_{msb} \ldots f_{lsb+1}f_{lsb}$gs (where "g" represents the guard bit and "s" represents the sticky bit), of the result of the approximation calculation step has the pattern $f_{msb} \ldots f_{lsb+1}$000, the rounded result will be indicated as being exact. On the other hand, if the fraction field bits, $f_{msb} \ldots f_{lsb+1}f_{lsb}$gs, of the result of the approximation calculation step has any of the seven patterns, $f_{msb} \ldots f_{lsb+1}$001 through $f_{msb} \ldots f_{lsb+1}$111, the rounded result will be indicated as being inexact.

Accordingly, if the fraction field bits, $f_{msb} \ldots f_{lsb+1}f_{lsb}$gs, of the result of the approximation calculation step have any one of the patterns, X . . . X00000, X . . . X01000, X . . . X10000, and X . . . X11000, where "X" can be either "zero" or "one," the rounded result will be considered exact. On the other hand, if the fraction field bits, $f_{msb} \ldots f_{lsb+1}f_{lsb}$gs, of the result of the approximation calculation step have any one of the patterns, for example, X . . . X0001 (i.e., a value immediately greater than the first value X . . . X00000) through X . . . X00111 (i.e., a value immediately less than the second value X . . . X01000), the rounded result will be considered inexact. If an inexact value is to be used as an operand in a computation, the floating point unit 10 can, for example, use a value that is half-way between the nearest exact values in performing the computation, in this example, X . . . X00100.

More specifically, in the inexact rounding mode of an embodiment of the present invention, the rounded result is generated as shown in Table 1 below, where "ExOpd" is "1" if at least one operand involved in the computation is inexact and "0" otherwise and the "Before Rounding" columns refer to the results as generated during the approximation computation step. None of the other bits of the result generated during the approximation computation step may be affected in the inexact rounding mode.

TABLE 1

| | Before Rounding | | | | After Rounding | |
|---|---|---|---|---|---|---|
| ExOpd | $f_{lsb+1}$ | $f_{lsb}$ | g | s | $f_{lsb+1}$ | $f_{lsb}$ |
| 0 | 0 | 0 | 0 | 0 | 0 | 0 |
| 0 | 1 | 1 | 1 | 0 | 1 | 1 |
| 1 | 0 | 0 | 1 | 0 | 0 | 1 |
| 0 | 0 | 0 | 1 | 1 | 0 | 1 |
| 0 | 0 | 1 | 0 | 0 | 0 | 1 |
| 0 | 0 | 1 | 0 | 1 | 0 | 1 |
| 0 | 0 | 1 | 1 | 0 | 0 | 1 |
| 0 | 0 | 1 | 1 | 1 | 0 | 1 |
| 0 | 1 | 0 | 0 | 0 | 1 | 0 |
| 0 | 1 | 0 | 0 | 1 | 1 | 1 |
| 0 | 1 | 0 | 1 | 0 | 1 | 1 |
| 0 | 1 | 0 | 1 | 1 | 1 | 1 |
| 0 | 1 | 1 | 0 | 0 | 1 | 1 |
| 0 | 1 | 1 | 0 | 1 | 1 | 1 |
| 0 | 1 | 1 | 1 | 0 | 1 | 1 |
| 0 | 1 | 1 | 1 | 1 | 1 | 1 |
| 1 | 0 | 0 | 0 | 0 | 0 | 1 |
| 1 | 0 | 0 | 0 | 1 | 0 | 1 |
| 1 | 0 | 0 | 1 | 0 | 0 | 1 |
| 1 | 0 | 0 | 1 | 1 | 0 | 1 |
| 1 | 0 | 1 | 0 | 0 | 0 | 1 |
| 1 | 0 | 1 | 0 | 1 | 0 | 1 |
| 1 | 0 | 1 | 1 | 0 | 0 | 1 |
| 1 | 0 | 1 | 1 | 1 | 0 | 1 |
| 1 | 1 | 0 | 0 | 0 | 1 | 1 [*See below] |
| 1 | 1 | 0 | 0 | 1 | 1 | 1 |
| 1 | 1 | 0 | 1 | 0 | 1 | 1 |
| 1 | 1 | 0 | 1 | 1 | 1 | 1 |
| 1 | 1 | 1 | 0 | 0 | 1 | 1 |
| 1 | 1 | 1 | 0 | 1 | 1 | 1 |
| 1 | 1 | 1 | 1 | 0 | 1 | 1 |
| 1 | 1 | 1 | 1 | 1 | 1 | 1 |

As is evident from Table 1, generally the second least significant bit, $f_{lsb+1}$, of the fraction action field of the rounded result will correspond to the second least significant bit, $f_{lsb+1}$, of the fraction field generated during the approximation computation step, except in the case the line marked with the asterisk ("*"). In the case of the line marked with the asterisk, the least significant bit, $f_{lsb}$, of the rounded result is set to a binary one to indicate that the rounded result is inexact because at least on operand is inexact. In addition, the second least significant bit, $f_{lsb+1}$, of the rounded result is set to a binary zero in analogy to the tie-breaking rules in the "round-to-nearest" rounding mode of IEEE Std. 754, in which the least significant bit $f_{lsb}$ is forced to "zero" when the guard bit is "one" and the sticky bit is "zero."

The rounded results specified in Table 1 correspond to the following logic equations:

$$\text{rounded } f_{lsb} = \text{ExOpd OR } (f_{lsb} \text{ OR } g \text{ OR } s) \quad (1)$$

$$\text{rounded } f_{lsb+1} = f_{lsb+1} \text{ AND NOT (ExOpd AND NOT } (f_{lsb} \text{ OR } g \text{ OR } s)) \quad (2)$$

where $f_{lsb}$ and $f_{lsb+1}$ on the right hand side of the logic equations correspond to the respective bits of the result generated during the approximation computation step.

As noted above, values in the zero format 30 and the infinity format 35 are always considered to be exact, and values in the underflow format 31 and overflow format 34 are always considered to be inexact. It will be appreciated from the above description of the various formats 30 through 36 that, for the zero format 30, the least significant fraction field bit, $f_{lsb}$, is clear (i.e., a "zero" bit) to indicate that the result is exact. For each of the underflow format 31 and overflow format 34, the least significant fraction field bit, $f_{lsb}$, is set (i.e., a "one" bit) to indicate that the result is inexact. On the other hand, the least significant fraction field bit, $f_{lsb}$, of the infinity format 35 is the inexact flag, x, represented explicitly like the other flags. Similarly, the least significant fraction field bit, $f_{lsb}$, of the NaN format 36 is the inexact flag, x, represented explicitly like the other flags.

Figure 3:
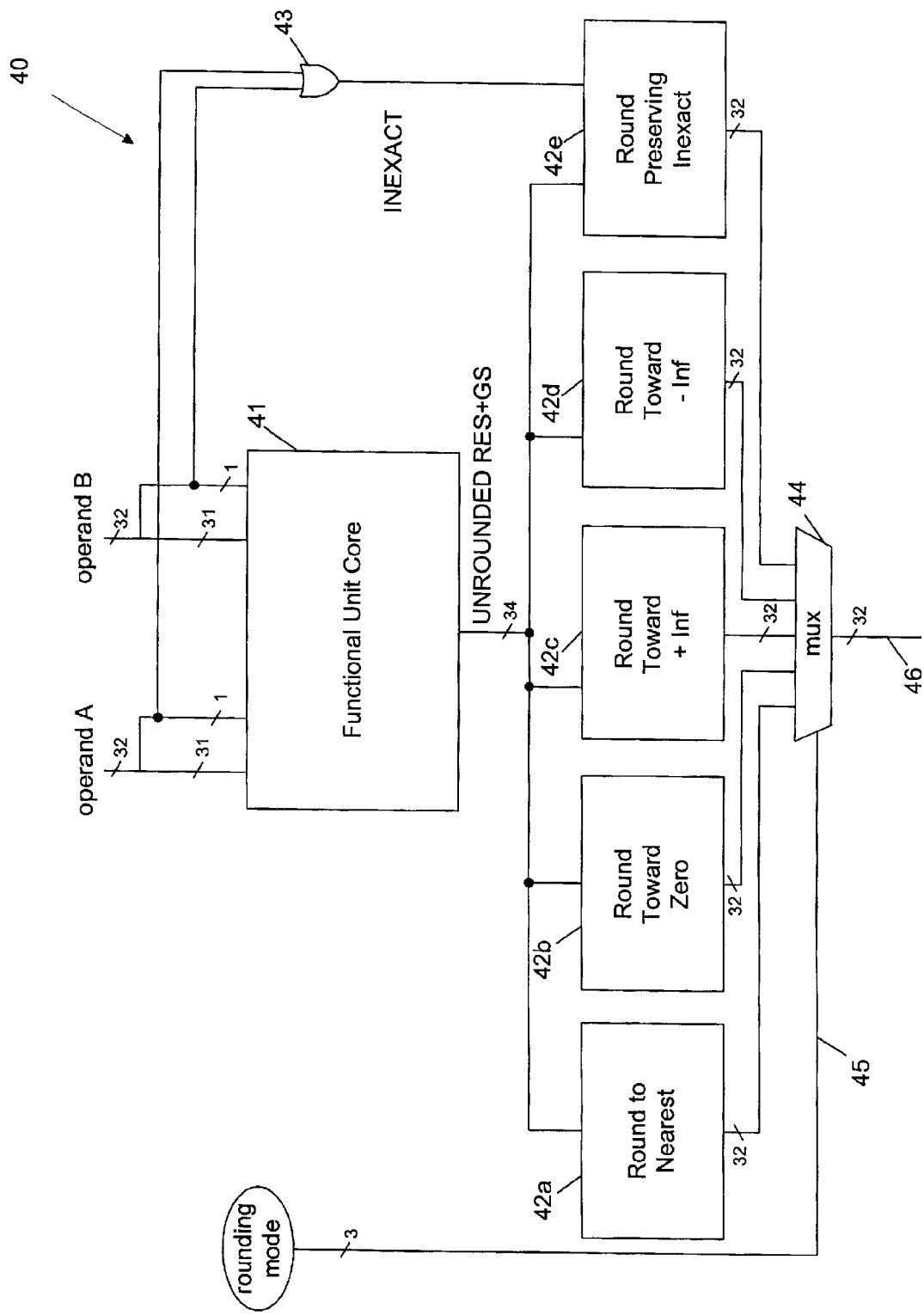
FIG. 3 depicts a functional block diagram of an exemplary functional unit depicted in FIG. 1 for performing floating point operations using two operands, which includes a rounding unit for providing inexact status information in the result in accordance with an embodiment of the invention.
Figure 4:
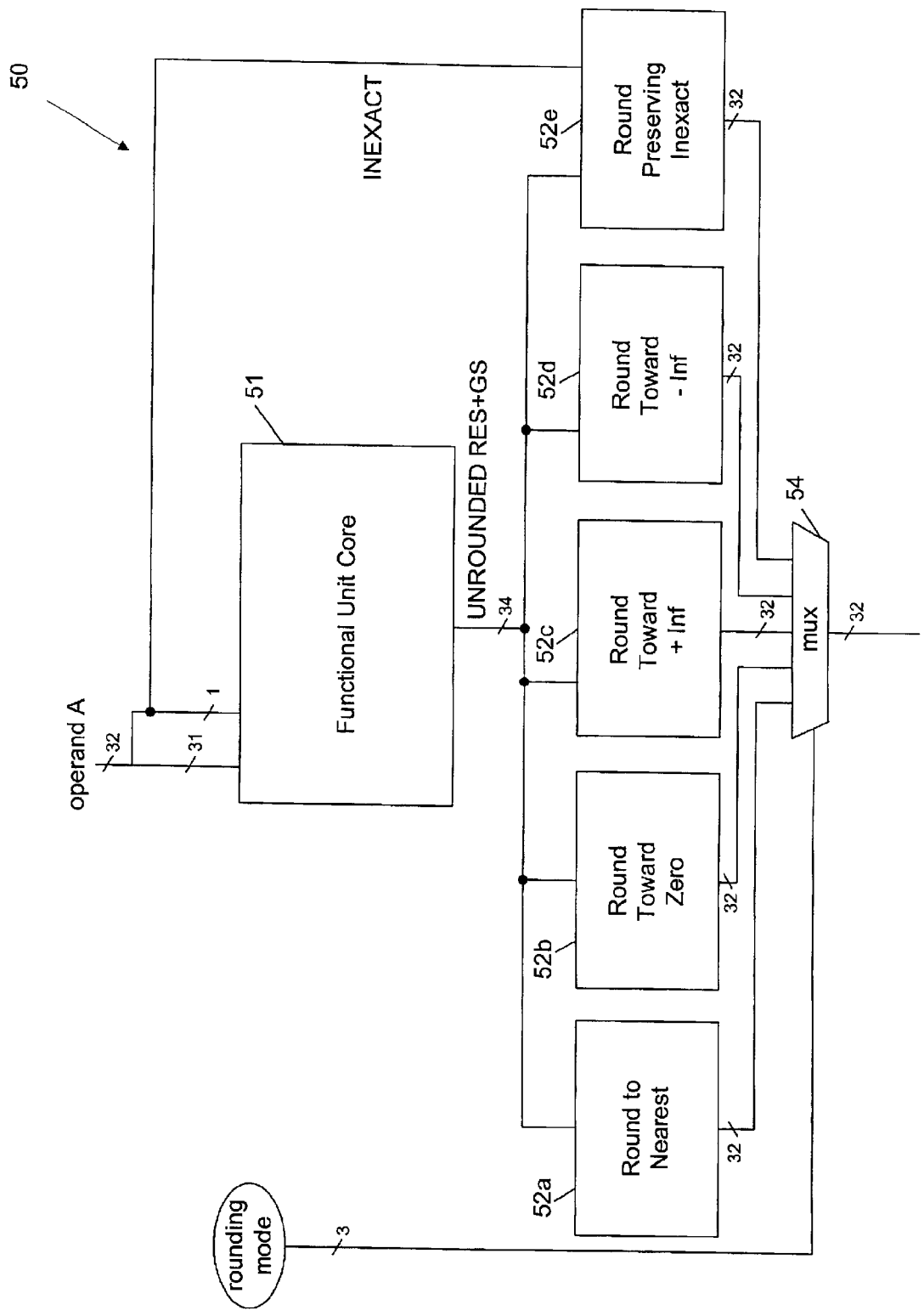
FIG. 4 depicts a functional block diagram of an exemplary functional unit depicted in FIG. 1 for performing floating point operations using one operand, which includes a rounding unit for providing inexact status information in the result in accordance with an embodiment of the invention.

FIG. 3 depicts a functional block diagram of an exemplary functional unit 40 for performing a floating point computation using two operands. The functional unit 40 may comprise, for example, the adder unit 11, multiplier unit 12, or divider unit 13. FIG. 4 depicts a functional block diagram of an exemplary functional unit 50 for performing a floating point computation using one operand. The functional unit 50 may comprise, for example, the square root unit 14.

The maximum/minimum functional unit 15 generally does not perform a rounding operation regardless of the rounding mode. Indeed, for the MAX(x, y) (or MIN(x, y)) operation performed by the maximum/minimum unit 15, if the larger (or smaller) operand is exact, the result will be the exact operand with the least significant fraction field bit, $f_{lsb}$, indicating that the result is exact. On the other hand, if the larger (or smaller) operand is inexact, the result will be the inexact operand with the least significant fraction field bit, $f_{lsb}$, indicating that the result is inexact. In both cases, since the least significant fraction field bit, $f_{lsb}$, of the larger (or smaller) operand is properly conditioned to indicate the operand's exact or inexact condition, the maximum/minimum unit 15 may not need to be provided with circuitry to condition the bit.

With reference to FIG. 3, exemplary functional unit 40 may include a functional unit core 41, a plurality of rounding units 42a–42e, an OR gate 43, and a multiplexer 44. The core 41 receives two operands and generates a result that represents an unrounded result plus a guard bit and a sticky bit, which is generated during the approximation calculation step described above. Each of the rounding units 42a–42e receives the result generated by the core 41 and generates a signal representing a rounded value according to its rounding mode. That is, rounding unit 42a generates a signal representing a rounded value according to the "round to nearest" rounding mode; rounding unit 42b according to the "round toward zero" rounding mode; rounding unit 42c according to the "round toward plus infinity" rounding mode; rounding unit 42d according to the "round toward minus infinity" rounding mode; and rounding unit 42e according to the "inexact" rounding mode described above.

In one embodiment, the OR gate 43 receives signals representative of the least significant fraction field bits, $f_{lsb}$, of the respective operands, operand A and operand B, and generates a signal provided to rounding unit 42e. This generated signal is equal a binary one if either signal feeding OR gate 43 equals a binary one. In this embodiment, the respective signals feeding OR gate 43 will equal a binary one if the least significant fraction field bit, $f_{lsb}$, of the respective operands equals a binary one. Accordingly, if the signal from OR gate 43 equals a binary one, then at least one operand is inexact. The signal generated by the OR gate 43 is provided to rounding unit 42e, which uses the generated signal to generate another signal representing a rounded value according to the inexact rounding mode.

The rounded values generated by rounding units 42a–42e are coupled to respective inputs of multiplexer 44. The multiplexer 44 also receives control signals 45 indicative of the rounding mode to be used by the functional unit 40. In one embodiment, three control signals are used to indicate which of the five rounding modes to use. The control signals 45 enable the multiplexer 44 to couple signals from one of the five rounding units 42a–42e as the result signal 46. The result signal 46 represents the rounded value generated during the rounding step described above.

As noted above, FIG. 4 depicts a functional block diagram of an exemplary functional unit 50 for performing a floating point computation using one operand. The structure and operation of functional unit 50 are similar to the structure and operation of functional unit 40, except that, no OR gate 43 is provided to generate a signal since the functional unit 50 has only one operand. Instead, a signal representative of the least significant fraction field bit, $f_{lsb}$, of the operand is provided to the rounding unit 52(e) to indicate whether the operand is exact. Multiplexer 54 operates similarly to multiplexer 44.

The functional unit cores 41 and 51 and rounding units 42a–42d and 52a–52d may comprise any conventional circuitry as will be appreciated by those of ordinary skill in the art, or circuitry described in the aforementioned Steele patent application. Functional units 40, 50 may be realized entirely in software, entirely in hardware, or in any combination of software and hardware.

Figure 5:
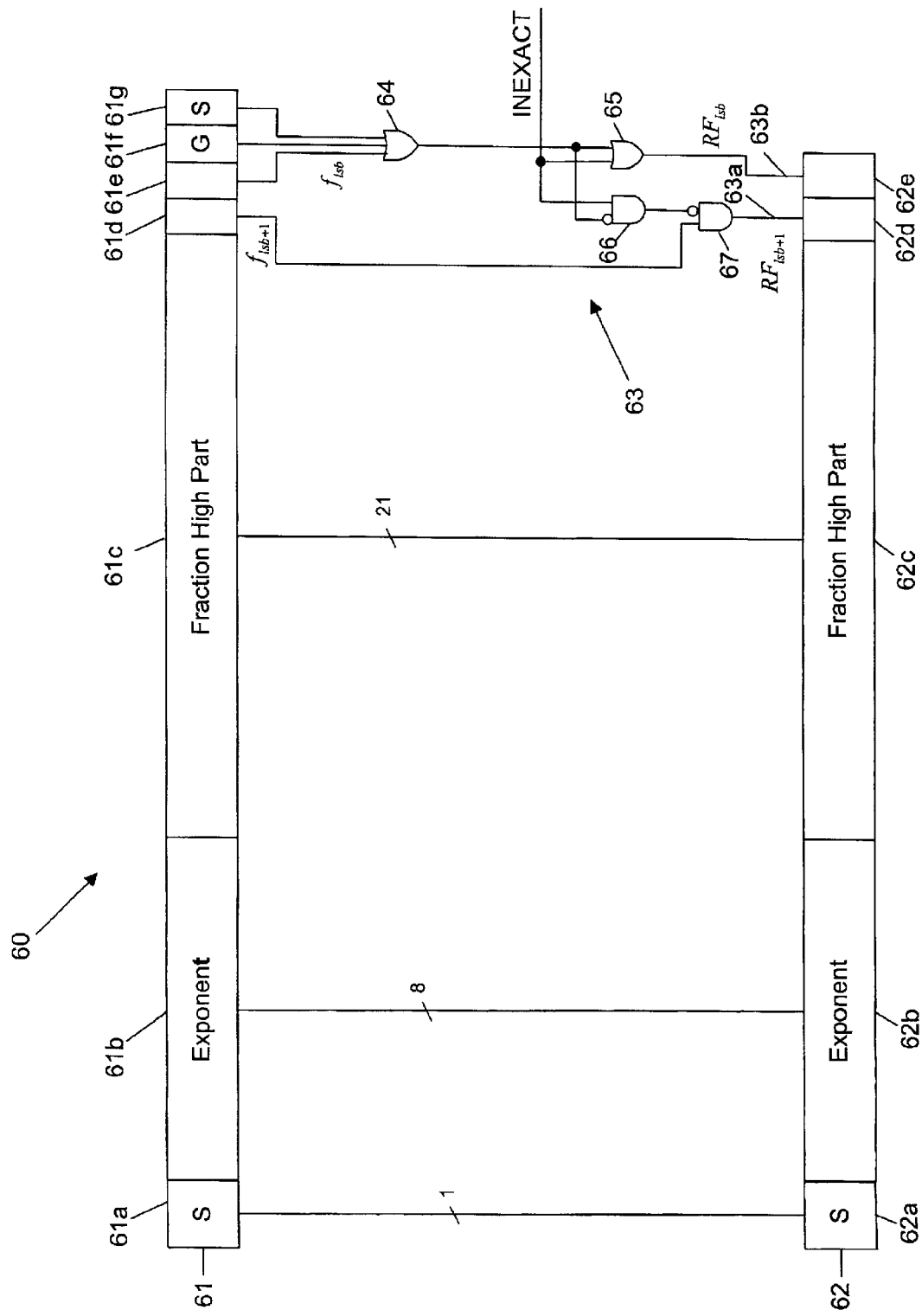
FIG. 5 depicts a logic diagram of an exemplary rounding unit for use in the functional units depicted in FIGS. 3 and 4 in accordance with an embodiment of the invention.

The structure and operation of the exemplary rounding units 42e, 52e will be described in detail with reference to FIG. 5. The rounding units 42e, 52e will be identified by reference numeral 60. In this embodiment, rounding unit 60 includes an input buffer 61, an output buffer 62, and a rounding logic 63. The input buffer 61 receives and buffers the signal (unrounded RES+GS) provided by the functional unit core 41, 51. The signal typically includes signals representative of the sign bit 61a, the exponent field bits 61b, $e_{msb} \ldots e_{lsb}$, the fraction field bits 61c–e, $f_{msb} \ldots f_{lsb}$, the guard bit 61f, and the sticky bit 61g of the result generated during the approximation calculation step by the functional unit core 41, 51. The output buffer 61 receives and buffers signals representative of the bits corresponding to the result rounded in accordance with the inexact rounding mode. The signals received and buffered by the output buffer 61 include a sign bit 62a, exponent field bits 62b, $e_{msb} \ldots e_{lsb}$, and fraction field bits 62c–e, $f_{msb} \ldots f_{lsb}$.

In generating the result rounded in accordance with the inexact rounding mode in the illustrated embodiment of the invention, the sign bit 61a, the exponent field bits 62b, and the high-order fraction field bits, $f_{msb} \ldots f_{lsb+2}$, 61c are not changed. Therefore, the signals representative of those bits may be coupled directly from the input buffer 61 to the output buffer 62. The rounding logic 63 receives signals representative of the second least significant fraction field bit 61*d*, $f_{lsb+1}$, the least significant bit 61*e*, $f_{lsb}$, the guard bit 61*f*, and, the sticky bit 61*g*, in input buffer 61, along with the signal indicating whether the input is inexact (i.e., the signal generated by OR gate 43 in FIG. 3 or the least significant bit of the operand in FIG. 4). The rounding logic 63 processes the received signals in accordance with the logic equations (1) and (2) above to generate signals 63*a*, 63*b* representative of the least significant bits $f_{lsb+1}$, $f_{lsb}$ of the rounded result. Signals 63*a*, 63*b* are received by and stored in the output buffer 62 along with signals representative of bits 61*a–c*. The rounding logic 63 may include OR gates 64, 65, which generate the signal 63*b* representative of the least significant bit, $f_{lsb}$, of the rounded result in accordance with logic equation (1). The rounding logic 63 may further include NAND gates 66 and 67, which generate the signal 63*a* representative of the second least significant bit, $f_{lsb+1}$ of the rounded result signal in accordance with logic equation (2) above.

In summary, embodiments of the present invention provide an arrangement for providing an indication that a floating point value is inexact in the value itself, without requiring use of additional flags that may be stored in a floating point status register, for example. Embodiments of the invention further provide for a rounding mode that facilitates preservation of whether a result of a floating point computation is inexact using the inexact indication arrangement described herein.

It will be appreciated that a rounding unit, such as rounding unit 60, may be provided for each of the functional units that perform floating point operations for which rounding may need to occur. Alternatively, the floating point unit 10 may be provided with a single rounding unit that may be shared among the functional units and perform floating point operations for which rounding may need to occur.

Further, the above description of the floating point unit 10 assumed that the floating point operands are represented in a number base of two. However, the floating point unit 10 may be adapted for floating point operands represented in number bases other than base two, using, for example, decimal digits or hexadecimal (base 16) digits rather than binary bits. The floating operand represented in other number bases may be rounded from an intermediate result that includes a guard digit and a sticky digit. Further, an inexact indication may be provided by setting, for example, a least significant digit equal to some specific value, such as one-half of the number base. Adapting the floating point unit 10 to receive floating point operands represented in other number bases will be obvious to those of ordinary skill in the art.

Still further, the above description of the floating point unit 10 has been limited to operands according to the aforementioned Steele patent application. However, the floating point unit 10 may be adapted to receive a floating point operand having a different format including having a different bit position or more than one bit position for storing inexact status information. Adapting the floating point unit 10 to receive a floating point operand having a different format will be obvious to those of ordinary skill in the art.

It will be appreciated that a system in accordance with the invention can be constructed in whole or in part from special purpose hardware or a general purpose computer system, or any combination thereof, any portion of which may be controlled by a suitable program. For example, the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements which may be connected directly to the system or which may transfer the information to the system over a network or other mechanism for transferring information in a conventional manner.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for performing a rounding step of a floating point computation on at least one floating point operand to preserve an inexact status, the method comprising:
   receiving the at least one operand and determining whether the at least one operand is inexact;
   determining whether an intermediate result of a floating point computation is inexact; and
   rounding the intermediate result based on whether the at least one operand is inexact and whether the intermediate result is inexact to preserve an inexact status of the at least one operand and the intermediate result.

2. The method of claim 1, wherein determining whether the at least one operand is inexact comprises analyzing embedded information within the at least one operand.

3. The method of claim 1, wherein determining whether the at least one operand is inexact comprises analyzing information stored in a register.

4. The method of claim 1, wherein determining whether the intermediate result is inexact comprises analyzing at least one digit of the intermediate result.

5. The method of claim 4, wherein determining whether the intermediate result is inexact comprises analyzing a least significant digit of the intermediate result, a guard digit, and a sticky digit.

6. The method of claim 1, wherein rounding the intermediate result comprises:
   altering a least significant digit of the intermediate result if either the at least one operand is inexact or the intermediate result is inexact; and
   altering a second least significant digit of the intermediate result if the second least significant digit of the intermediate result is equivalent to a specified value and either the at least one operand is inexact or the intermediate result is inexact.

7. The method of claim 6, wherein the specified value is a binary one.

8. The method of claim 1, further comprising receiving a rounding mode selection signal.

9. The method of claim 8, wherein the step of rounding further comprises rounding the intermediate result to preserve the inexact status if the rounding mode selection signal indicates a rounding mode to preserve inexact status.

10. A computer-readable medium on which is stored a set of instructions for performing a rounding step of a floating point computation on at least one floating point operand to preserve an inexact status, which when executed performs steps comprising:

determining whether the at least one operand is inexact;

determining whether the intermediate result of a floating point computation is inexact; and rounding the intermediate result based on whether the at least one operand is inexact and whether the intermediate result is inexact to preserve an inexact status of the at least one operand and the intermediate result.

11. The computer-readable medium of claim 10, wherein determining whether the at least one operand is inexact comprises analyzing embedded information within the at least one operand.

12. The computer-readable medium of claim 10, wherein determining whether the at least one operand is inexact comprises analyzing information stored in a register.

13. The computer-readable medium of claim 10, wherein determining whether the intermediate result is inexact comprises analyzing at least one digit of the intermediate result.

14. The computer-readable medium of claim 13, wherein determining whether the intermediate result is inexact comprises analyzing a least significant digit of the intermediate result, a guard digit, and a sticky digit.

15. The computer-readable medium of claim 10, wherein rounding the intermediate result comprises:

altering a least significant digit of the intermediate result if either the at least one operand is inexact or the intermediate result is inexact; and altering a second least significant digit of the intermediate result if the second least significant digit of the intermediate result is equivalent to a specified value and either the at least one operand is inexact or the intermediate result is inexact.

16. The computer-readable medium of claim 15, wherein the specified value is a binary one.

17. The computer-readable medium of claim 10, wherein the step of rounding further comprises rounding the intermediate result to preserve the inexact status if a rounding mode selection signal indicates a rounding mode to preserve inexact status.

18. A system for performing a rounding step of a floating point computation on at least one floating point operand to preserve an inexact status, the system comprising:

a functional core unit for generating an intermediate result based on the at least one operand; and a first rounding unit configured to receive the intermediate result and round the intermediate result based on whether the at least one operand is inexact and whether the intermediate result is inexact to preserve the inexact status of the at least one operand and the intermediate result.

19. The system of claim 18, wherein the first rounding unit is configured to:

alter a least significant digit of the intermediate result if either the at least one operand is inexact or the intermediate result is inexact; and alter a second least significant digit of the intermediate result if the second least significant digit of the intermediate result is equivalent to a specified value and either the at least one operand is inexact or the intermediate result is inexact.

20. The system of claim 19, wherein the specified value is a binary one.

21. The system of claim 18, further comprising:

at least one other rounding unit for rounding the intermediate result; and a multiplexer for selecting either the rounded intermediate result from the first rounding unit or the at least one other rounding unit based on a rounding mode selection signal.

22. A system for performing a rounding step of a floating point computation on at least one floating point operand to preserve an inexact status, the system comprising:

first determining means for determining whether the at least one operand is inexact;

second determining means for determining whether an intermediate result of a floating point computation is inexact; and rounding means for rounding the intermediate result based on whether the at least one operand is inexact and whether the intermediate result is inexact to preserve an inexact status of the at least one operand and the intermediate result.

23. The system of claim 22, wherein first determining means analyzes embedded information within the at least one operand.

24. The system of claim 22, wherein first determining means analyzes information stored in a register.

25. The system of claim 22, wherein second determining means analyzes at least one digit of the intermediate result.

26. The system of claim 25, wherein second determining means analyzes a least significant digit of the intermediate result, a guard digit, and a sticky digit.

27. The system of claim 22, wherein rounding means alters a least significant digit of the intermediate result if either the at least one operand is inexact or the intermediate result is inexact and alters a second least significant digit of the intermediate result if the second least significant digit of the intermediate result is equivalent to a specified value and either the at least one operand is inexact or the intermediate result is inexact.

28. The system of claim 22, further comprising receiving means for receiving a rounding mode selection signal.

29. The system of claim 28, wherein the rounding means rounds the intermediate result to preserve the inexact status if the rounding mode selection signal indicates a rounding mode to preserve inexact status.

* * * * *